May 16, 1961  J. A. SCHNEIDER  2,984,211
DOOR CLOSURE THRUSTER
Filed April 1, 1960
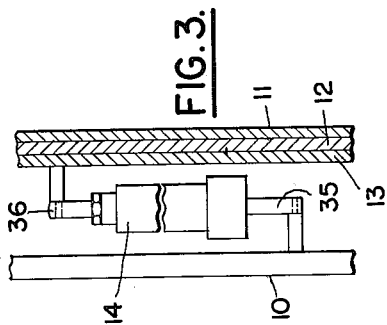
FIG. 3.
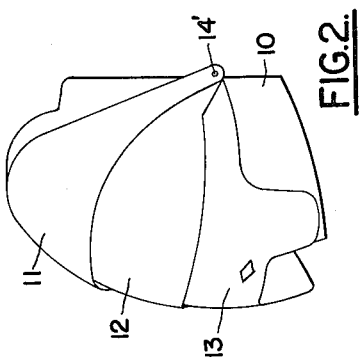
FIG.1.
FIG.2.
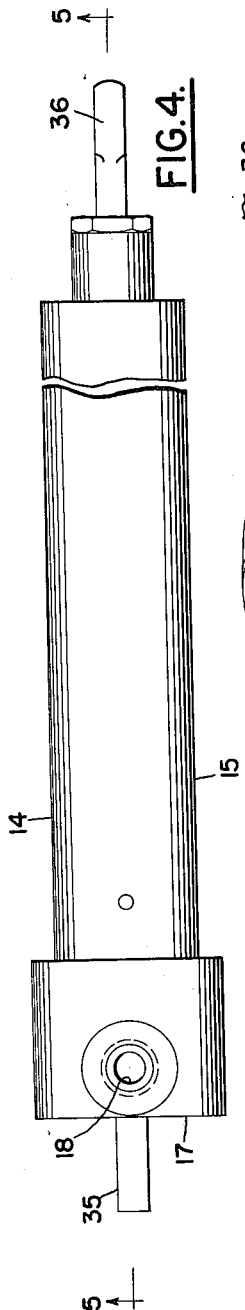
FIG.4.
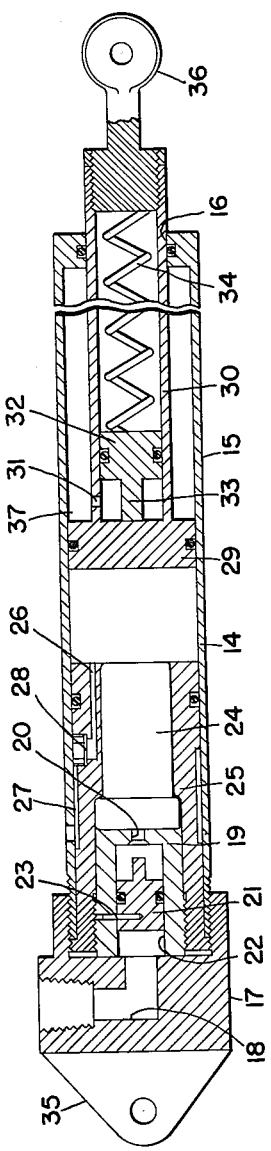
FIG.5.
INVENTOR.
JOHN A. SCHNEIDER
BY
S. J. Rotondi, A. T. Dupont & S. Dubroff

United States Patent Office 2,984,211
Patented May 16, 1961

2,984,211
DOOR CLOSURE THRUSTER

John A. Schneider, Philadelphia, Pa., assignor to the United States of America as represented by the Secretary of the Army Filed Apr. 1, 1960, Ser. No. 19,432
2 Claims. (Cl. 121—38)
(Granted under Title 35, U.S. Code (1952), sec. 266)

The invention described herein may be manufactured and used by or for the Government for governmental purposes without the payment to me of any royalty thereon.

This invention relates to gas pressure operated mechanisms, and its purpose is to provide an improved ballistically operated mechanism which functions with a cushioned or dampened movement and is adapted for manual operation both before and after it is operated ballistically.

Heretofore various means have been provided for ballistically ejecting a man-seat mass from a disabled aircraft. Recently there have come into use aircraft seats having shutter type doors which are closed to encapsulate the occupant of the seat in the case of an emergency. It is desirable that such doors be operable ballistically, that they be operable manually both before and after such ballistic operation, and that their motion be dampened during both types of operation. The present invention accomplishes these results by means of a thruster which (1) is connected between the seat and the door, (2) functions to restrictedly vent the operating gas, and (3) has the movement of its load actuating piston dampened by a fluid which surrounds a hollow piston rod and, upon movement of the load actuating piston, is forced into the hollow piston rod against the pressure of a spring-biased piston.

The invention will be better understood from the following description when considered in connection with the accompanying drawings and its scope is indicated by the appended claims.

Referring to the drawings:

Figs. 1 and 2 show the type of aircraft seat to which the present invention is applied, Fig. 3 indicates one possible way of connecting the thruster between the seat and the encapsulating door, Fig. 4 is an exterior view of the thruster, and Fig. 5 is a section taken on the line 5—5 of Fig. 4.

Fig. 1 shows an ejectable aircraft seat 10 which is associated with an encapsulating door consisting of sections 11, 12 and 13. These sections are pivoted to seat 10 at a point 14' on each side of the seat. The door 11—12—13 is moved from its Fig. 1 open position to its Fig. 2 closed position by a thruster 14 which couples the section 13 to the seat 10 as diagrammatically indicated by Fig. 3.

The thruster 14 includes a cylinder 15 which has at one end a central opening 16 and at the other end a cap 17 with a passageway 18 extending therethrough. A sleeve 19 having an aperture 20 at its inner end forms a guideway 22 for a firing pin 21. This guideway communicates with the passageway 18, and the firing pin 21 is fixed to its wall by a shear pin 23. A cartridge 24 is supported in an adapter 25 with its primer in reach of the firing pin 21.

The sleeve 19 and adapter 25 are fixed to the cylinder 15 by the cap 17 which is threaded onto the end of the cylinder. For restrictedly venting the operating gas from the cylinder, there is provided in the adapter 25 passageways 26 and 27 between which is a sealing disk 28 adapted to be ruptured by the gas pressure within the cylinder.

For convenience of expression, the above-described assembly is hereinafter referred to as means for generating and restrictedly venting a gas under pressure.

A main piston 29 is movable in the cylinder 15 and is fixed to a hollow rod 30 which extends through the central opening 16 and has near its inner end an orifice 31. A floating piston 32 is movable in the hollow rod 30 and has an extension 33 which is biased into engagement with the main piston 29 by a spring 34 in a manner to maintain the orifice 31 between the two pistons. Surrounding the rod 30 and the extension 33 is a damping fluid 37.

The thruster 14 has at one end a lug 35 for attaching it to the seat and at the other end a lug 36 for attaching it to the door section 13.

With the thruster 14 in its illustrated position, the encapsulating door 11—12—13 is open as shown in Fig. 1. It is operated to the closed position, indicated in Fig. 2, by the application of a gas pressure to the firing pin 21. As a result of this pressure, the shear pin 23 is ruptured, the firing pin 21 is driven against the primer of the cartridge 24, and a gas pressure is generated in the cylinder 15. This generated gas ruptures the disk 28 so that the gas is restrictedly vented through the passageways 26 and 27. It also functions to move the main piston 29.

As the piston 29 moves, its motion is damped by the fluid 37 which is forced through the orifice 31 thereby driving the floating piston 32 away from the main piston 29 and compressing the spring 34. As the main piston 29 moves, the lug 36 is extended and the door sections are moved to their closed position.

Prior to ballistic operation of the thruster, the main piston 29 is manually movable in the cylinder 15. After ballistic operation of the thruster, the operating gas is restrictedly vented through the passageways 26 and 27 so that the original standby condition may be restored manually when the door is unlatched.

I claim:

1. In a mechanism to be operated by a gas pressure, the combination of a cylinder having at one end a central opening and at the other end means for generating and restrictedly venting a gas under pressure, a main piston movable in said cylinder and fixed to a hollow rod extending through said central opening, a floating piston movable in said rod and having an extension whereby it is spaced from said main piston, said hollow-rod having a vent through its wall at a point between said pistons, a spring biasing said extension against said main piston, and a damping fluid surrounding said rod and movable thereinto through said vent upon movement of said main piston, whereby said movement is dampened.

2. In a mechanism to be operated by a gas pressure, the combination of a cylinder having at one end a central opening and at the other end a cap with a passageway extending therethrough, a firing pin, means forming for said firing pin a guideway communicating with said passageway and having an aperture at its inner end, a shear pin coupling said firing pin to the wall of said guideway, means supporting a cartridge in said cylinder with its primer adjacent said aperture, said guideway forming means and said cartridge supporting means being anchored in said cylinder by said cap and said cartridge supporting means forming a restricted orifice between the interior and exterior of said cylinder, a frangible membrane in said orifice, a main-piston movable in said cylinder and fixed to a hollow rod extending through said central opening, a floating piston movable in said rod and having an extension whereby it is spaced from said main piston, said hollow-rod having a vent through its wall at a point between said pistons, a spring biasing said extension against said main piston, and a damping fluid surrounding said rod and movable thereinto through said vent upon movement of said main piston, whereby said movement is dampened.

References Cited in the file of this patent

UNITED STATES PATENTS

| | | |
|---|---|---|
| 2,857,890 | Stott | Oct. 28, 1958 |
| 2,883,909 | Musser et al. | Apr. 28, 1959 |